June 17, 1924.  
C. H. TURNER  
SAFETY DEVICE FOR CAR TRUCKS  
Filed Nov. 9, 1923
1,498,494
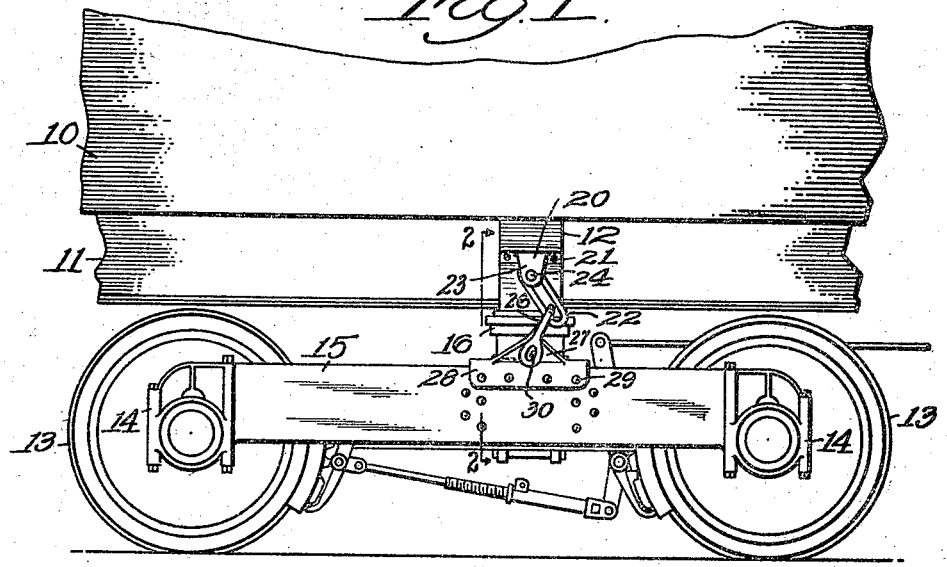
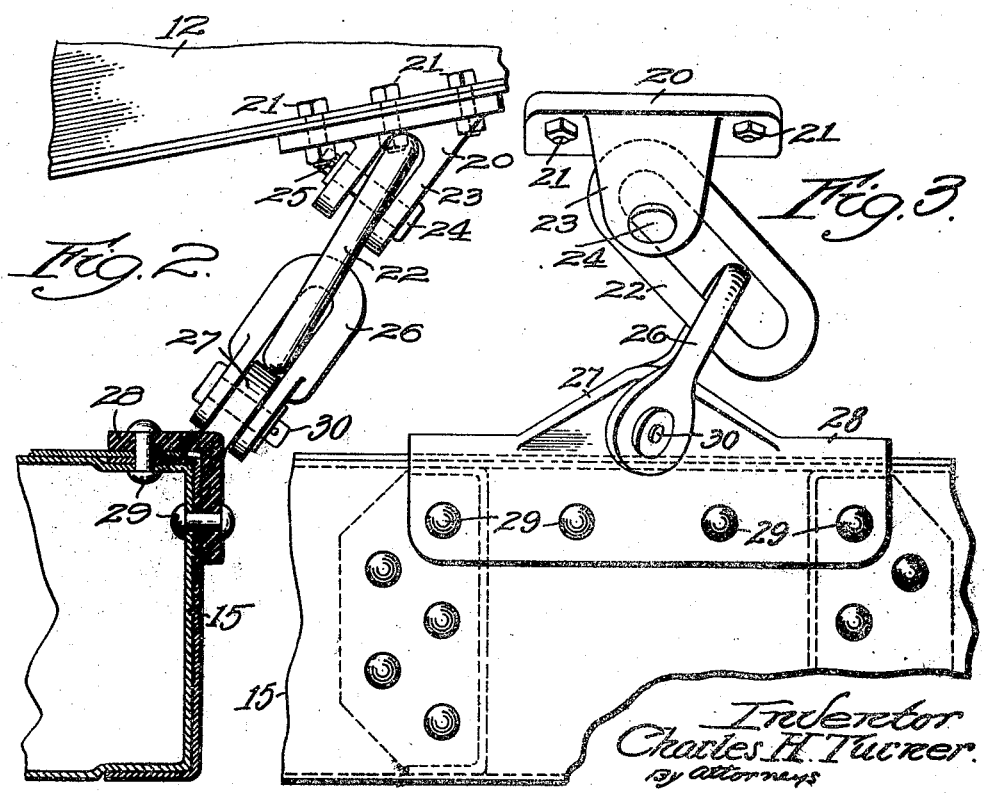
Inventor  
Charles H. Turner  
By Attorneys  
Southgate & Southgate Patented June 17, 1924.

1,498,494

UNITED STATES PATENT OFFICE.

CHARLES H. TURNER, OF WORCESTER, MASSACHUSETTS, ASSIGNOR TO OSGOOD BRADLEY CAR COMPANY, OF WORCESTER, MASSACHUSETTS, A CORPORATION OF MASSACHUSETTS.

SAFETY DEVICE FOR CAR TRUCKS.

Application filed November 9, 1923. Serial No. 673,801.

*To all whom it may concern:*

Be it known that I, CHARLES H. TURNER, a citizen of the United States, residing at Worcester, in the county of Worcester and State of Massachusetts, have invented a new and useful Safety Device for Car Trucks, of which the following is a specification.

This invention relates to a railroad car and particularly to means for preventing excess angular or swinging movement of the car trucks. Provision must be made in car construction for a certain amount of angular movement of the trucks to permit the car to follow the curves of the track. It is advisable, however, that this movement be limited to a comparatively small angle, so that the trucks will be prevented from turning transversely of the car in case of derailment or other accident.

It is the object of my invention to provide improved safety devices for such purposes, by which the angular movement of the trucks may be definitely limited and by which the several parts are combined and connected in a more positive and effective manner than has been heretofore customary.

My invention in its preferred form embodies the use of a car frame having transversely extending bolsters or frame members at the points of attachment of the trucks, in combination with special safety devices directly connecting the ends of the car bolsters to the side frame members of the trucks and permitting limited turning movement only of the trucks.

My invention further relates to arrangements and combinations of parts which will be hereinafter described and more particularly pointed out in the appended claims.

A preferred form of the invention is shown in the drawings in which—

Fig. 1 is a partial side elevation of a car embodying my improvements;

Fig. 2 is a transverse sectional elevation, taken along the line 2—2 in Fig. 1; and Fig. 3 is a side elevation of the parts shown in Fig. 2.

Referring to the drawings, I have shown a portion of a car body 10 resting upon an under frame comprising sills 11 and cross frame members or bolsters 12. The car is supported upon wheels 13 having bearings 14 at the ends of truck frame members 15. An upwardly projecting portion 16 of each truck frame has a pivotal connection with one of the bolsters 12 at the center of its length.

My improved safety devices include brackets 20 firmly secured to the bolsters 12 by bolts or rivets 21. A link 22 is secured for lost motion between ears 23 of each bracket 20 by a stud 24, which may be held in position by a cross pin 25 or in any other convenient manner. A second link or clevis 26 is passed through each link 22, and the separated ends of the clevis embrace a lug or projection 27 on a stand 28 which is firmly secured to one of the truck frame members 15 by bolts or rivets 29. A stud 30 forms the pivotal connection between the clevis 26 and the lug 27.

I have thus provided an extremely strong and reliable connection between the car truck and the car frame, each bracket 20 being rigidly secured to a cross frame member or bolster 12 and each stand 28 being similarly secured to a truck frame member 15 near the center of its length.

The construction is much more positive and reliable than the long safety chains which have been previously used and which have been attached to the trucks near the wheel bearings, at which point maximum angular movement of the truck must be permitted. With my construction, these long chains are each replaced by two simple moving parts, the link 22 and the clevis 26, both of which may be made as heavy as is desirable. These parts are also easily and conveniently connected in a very positive manner with the truck frame and bolster.

Having thus described my invention and the advantages thereof, I do not wish to be limited to the details herein disclosed otherwise than as set forth in the claims, but what I claim is:—

1. In a railroad car, a car frame having a transverse bolster, a car truck having a rigid truck frame, said truck being pivotally connected to said car frame beneath said transverse bolster, and safety devices connecting the ends of said bolster to points on said truck frame adjacent the center of the length thereof and positively limiting relative angular movement of said truck.

2. In a railroad car, a car frame having a transverse bolster, a car truck having a rigid truck frame, said truck being pivotally connected to said car frame beneath said transverse bolster, and a pair of safety chains, each connecting one end of said bolster to an adjacent point on said truck frame intermediate its ends and positively limiting angular movement of said truck.

3. In a railroad car, a car frame having a transverse bolster, a car truck having a rigid truck frame, said truck being pivotally connected to said car frame beneath said transverse bolster, and a pair of safety devices, each forming a lost motion connection between one end of said body bolster and an adjacent intermediate point on a side frame member of said truck.

4. In a railroad car, a car frame having a transverse bolster, a car truck having a rigid truck frame, said truck being pivotally connected to said car frame beneath said transverse bolster, brackets rigidly secured to each end of said bolster, links pivoted in said brackets, stands rigidly secured to the side members of the truck frames at points adjacent the center of length thereof, and additional links connecting said truck frame stands to said first named links to positively limit angular movement of said trucks.

5. In a railroad car, a car frame having a transverse bolster, a car truck having a rigid truck frame, said truck being pivotally connected to said car frame beneath said transverse bolster, brackets rigidly secured to the said bolster at its ends and having ears thereon, a link pivoted between the ears of each bracket and having a lost motion connection with said bracket, stands secured to the side members of the truck frame intermediate their length and each having an upwardly projecting lug, and a clevis pivoted to each stand and extending through the associated link, said connected parts transversely limiting angular movement of said truck.

In testimony whereof I have hereunto affixed my signature.

CHARLES H. TURNER.